Dec. 15, 1953      L. I. YEOMANS      2,662,285
GRASS SHEARS WITH VERTICAL HANDLE ACTION
Filed May 16, 1952
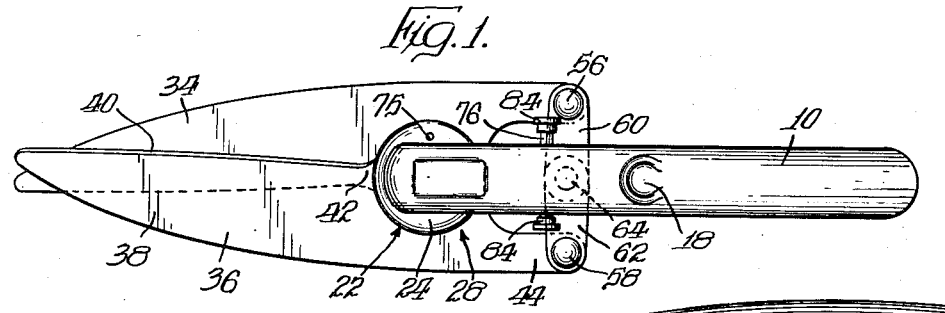
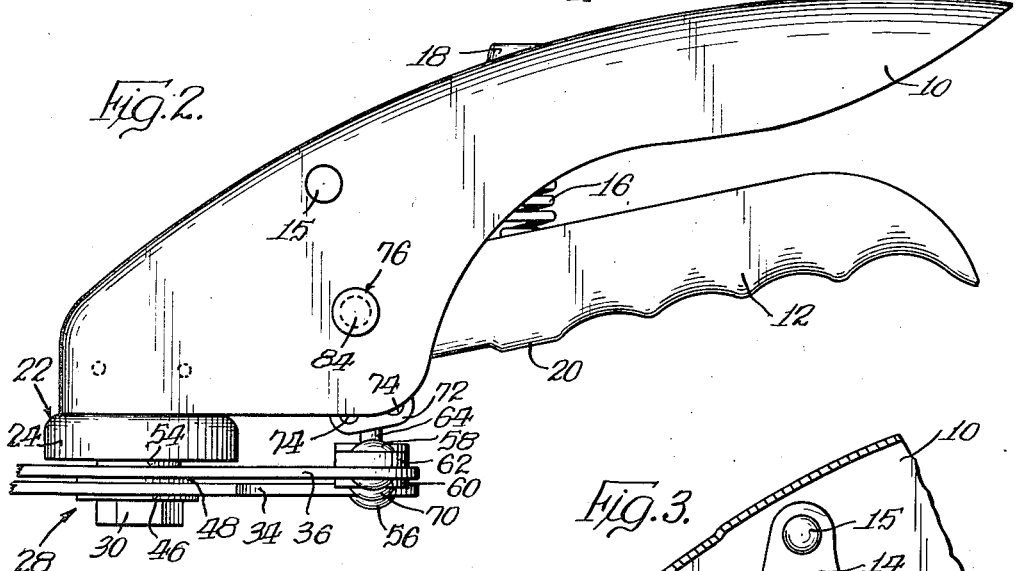
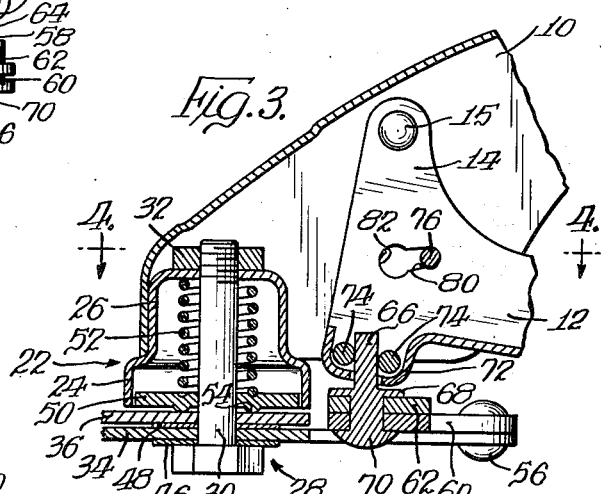
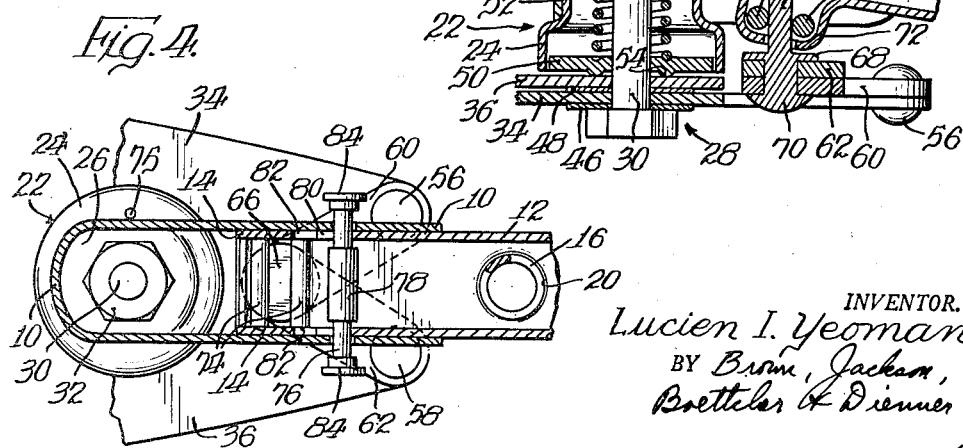
INVENTOR.
Lucien I. Yeomans
BY Brown, Jackson,
Boettcher & Dienner
Attys.

Patented Dec. 15, 1953

2,662,285

UNITED STATES PATENT OFFICE 2,662,285

GRASS SHEARS WITH VERTICAL HANDLE ACTION

Lucien I. Yeomans, Chicago, Ill., assignor to Midwest Tool and Cutlery Company, Sturgis, Mich., a corporation of Michigan Application May 16, 1952, Serial No. 288,174

17 Claims. (Cl. 30—248)

1

The present invention relates to improvements in gardener's grass shears or trimmers and, particularly, to improvements in shears of the type in which the blades are moved in a predetermined plane and are actuated upon relative movement of a pair of handles in a plane substantially perpendicular to the plane in which the blades are moved.

Devices of the general character referred to are well known in the art, but prior devices have not attained optimum effectiveness and have failed to meet the demands of the art. It is an object of the present invention to provide improved grass shears that eliminate the inherent limitations and disadvantages of prior devices of a similar nature, that are economical of manufacture and assembly, that are neat in appearance and compact, and that provide an effectiveness of operation heretofore unrealized.

Another object of my invention is the provision of improved grass shears including an improved main pivot comprising a relatively fixed pivot pin upon which the shear blades are pivoted and retained, and a spring pressed member mounted for axial sliding movement on the pivot pin for exerting pressure upon the blades to maintain the blades in self-sharpening contact with each other and for accommodating relative movement of the blades in a plane perpendicular to their nominal plane of movement, the said member also providing a secondary support for the pivot pin spaced a substantial distance from the relatively fixed point of support for the pin. In addition to providing an improved pivotal connection between the shear blades, the improved main pivot of the present invention readily lends itself to an improved method of lubrication whereby all moving contacts of the component parts of the shears about the main pivot may be readily lubricated without special care in that respect.

A further object of the present invention is the provision of means for automatically limiting travel of the blades in both directions of movement thereof and for manually locking the blades in closed position when desired. In particular, it is an object of the present invention to provide a single means including first and second abutment means for accomplishing both said functions in a convenient and economical manner.

As pointed out hereinbefore, the present invention has particular relation to shears of that type in which the blades are moved in a predetermined plane and are actuated upon relative movement of a pair of handles in a plane substantially perpendicular to the plane in which the blades are moved. In this respect, it is an object of the present invention to provide a substantial or sturdy upper handle which constitutes a frame or housing upon or within which the other components of the shears are mounted and properly related to each other, the upper handle itself providing means for the directional guidance of the shears. A lower, movable handle, which is spring pressed in one direction and manually operable in the other direction, is pivoted for oscillatory movement in the upper handle and is provided with a portion adapted to be operatively associated with the shear blades for actuating the same. The pivot pin of the improved main pivot referred to hereinbefore has its relatively fixed support in a component part or portion of the upper handle and the spring pressed member of the main pivot is guided for movement within the said component part of the upper handle. Due to the guided relationship of the spring pressed member with respect to the upper handle, the member provides a second point of support for the pivot pin. Accordingly, the upper handle and the main pivot, or at least the pin of the main pivot, are relatively fixed and the shear blades and lower handle are movable with respect thereto to provide an efficient cutting or shearing action.

To provide a highly efficient operative connection between the lower handle and the movable shear blades, it is an object of the present invention to provide a toggle linkage extending between the shear blades and the lower or movable handle, so arranged as to multiply the effective pressure exerted on the lower handle in direct ratio to the distance of the resistance of the cut from the main pivot upon which the shear blades are mounted. The lower movable handle is provided with a driving portion so arranged as to coact with the central or actuating pivot of the toggle linkage in such manner as to maintain its path of travel accurately along a straight line passing through its center, the main pivot of the shears, and equidistant from the cutting edges of both blades in all positions, while at the same time providing the pressure multiplying effect referred to hereinbefore.

A still further object of the present invention is to provide the automatic movement limiting and blade locking means referred to hereinbefore in the handle portions of the improved shears of the present invention. To this end, the said means comprises a member slidably mounted in and extending through parallel wall portions of the upper handle at a point fixed in relation to the pivot point of the lower handle and adapted to engage the opposite ends of slots through which the said member passes in parallel wall portions of the lower handle, the member thus limiting the extent of opening or closing movement of the shear blade by engagement with the ends of the slots. The said member is provided with an enlargement in its central portion adapted to enter by manual operation enlargements provided in the slots in the lower handle walls when the blades are substantially in their closed position so as to lock all moving parts of the shears. Accordingly, the single member comprises both a means for limiting the travel of the shear blades and a means for locking the shear blades in their closed position.

Other objects and advantages of the present invention will become apparent in the following detailed description of a preferred embodiment of the invention.

Now, in order to acquaint those skilled in the art with one manner of constructing and operating the improved grass shears of the present invention, I shall describe, in connection with the accompanying drawings, a preferred embodiment of my invention and one mode of constructing the same.

In the drawings, wherein like reference numerals refer to like parts:

Figure 1 is a top plan view of the improved shears of the present invention, showing the shear blades in closed position and locked in that position;

Figure 2 is a side elevation, on an enlarged scale, of the handle portion only of the improved shears shown in Figure 1;

Figure 3 is a vertical longitudinal cross-sectional view of the forward handle portion, including the main pivot, of the improved shears of the present invention, showing the shears in open position; and Figure 4 is a horizontal cross-sectional view taken substantially on the line 4—4 of Figure 3.

Referring now to the drawings, I have shown a preferred embodiment of my invention as including an upper handle member 10 of generally channel shape in cross section, with the channel thereof opening downwardly, and a lower handle member 12, also of channel shape, but with the channel opening upwardly. In the lower surface thereof, the lower handle 12 is provided with a plurality of indentations to provide a finger grip by means of which the handles may be actuated with respect to one another, the upper handle being received in the palm of the user's hand. At the forward edge thereof, the lower handle member 12 is provided with a pair of upwardly extending legs 14 by means of which the lower handle 12 is pivotally connected to the upper handle 10, suitably by means of a pin 15, or a pair of pins 15. As shown, the handle 12 is pivotally connected to the handle 10 adjacent to but spaced from the forward end of the handle 10 so that the handle 12 is adapted for movement within the handle 10 and has portions thereof interrelated with respect to the handle 10. The two handle members are normally biased apart by means of a spring 16, which comprises a conventional helically coiled spring, the ends of which are received in a small circular indentation 18 provided in the base wall of the upper handle 10 and a small circular indentation 20 provided in the base wall of the lower handle member 12. The indentations 18 and 20 are preferably shallow, but nevertheless retain the ends of the spring 16 in operative association with both of the handles to normally bias the handles away from one another.

At the forward end thereof, the upper handle member 10 is provided with a component part 22 comprising an inverted generally cup-shaped member having a lower cylindrical portion 24, that is circular or annular in cross section, and an upper portion 26, that is generally of elliptical shape in cross section. The upper portion 26 of the component 22 fits intimately within the handle 10 at the forward end thereof and is suitably secured thereto at spaced points, preferably by means of spot welding, as is indicated in Figure 2. The component part 22 is preferably secured to the handle 10 by means of carbon arc welding to prevent scarring or unsightly marking of the exterior surfaces of the handle 10. The component part 22 of the handle 10 comprises a housing for the main pivot 28 of the shears and constitutes one point of support for a pivot pin 30 of the main pivot 28. The pivot pin 30 preferably comprises a bolt having a fixed support in the relatively stationary upper handle 10. The bolt 30 is provided with a head externally of the tool and the fixed support in the handle is preferably disposed remotely of said head. To provide for a fixed support of the bolt within the handle 10, and yet to accommodate removal of the pivot pin or bolt, the upper portion 26 of the component part or housing 22 is provided with an aperture in the top wall thereof communicating with the tapped bore of a nut 32 into which the bolt 30 is adapted to be threaded. The nut 32 may be suitably secured to the housing 22 in any suitable manner, but is preferably secured thereto by projection welding the same to the top surface of the upper portion 26.

The head of the pivot pin or bolt 30 pivotally supports a pair of shear blades or blade members 34 and 36, the two blades being substantially identical but being mounted oppositely of one another on the pivot pin or bolt 30. With reference to the upper blade 36, as is shown in Figure 1, it will be appreciated that each blade comprises a forward blade portion 38 having a cutting edge 40, a central pivot portion 42 of generally circular outline, and a rearwardly extending tab or lever portion 44. At the central pivot portion thereof, each blade is apertured for the passage therethrough of the pivot pin or bolt 30. To reduce or eliminate friction at the pivotal mounting of the blades, it is preferable to provide a washer 46 between the head of the bolt 30 and the blade 34 and a second washer 48 between the two blades. As is conventional, the cutting portions 39 of the two blades are oppositely curved, toward one another, in a direction transverse of the plane of the blades so that the cutting action of the blades occurs substantially at a single point on the cutting edge 40 of each blade at a time. In other words, as the blades are moved toward one another, the cutting action of the blades will occur only at a single point, which point advances progressively from the inner toward the outer end of the blades as the blades are moved towards one another to the closed position shown in Figure 1. This provides a highly efficient cutting action and renders the blades self-sharpening.

In some prior art structures, the hereinbefore described cutting action has been accommodated by the flexibility of the blades themselves, in other structures by providing a loose pivot pin, and in still others by providing means for flexibly or resiliently urging the blades towards one another.

It is an object of the present invention to provide an improved main pivot of the type wherein the blades are resiliently urged towards one another. To this end, I provide a spring pressed member 50 adapted to engage the upper blade 36 to confine the blades between the member 50 and the head of the pivot pin or bolt 30. The member 50 is provided with a central aperture through which the pivot pin 30 freely extends so that the member 50 may move axially of the pin 30. A coil spring 52 is confined between the top wall of the housing 22 (the fixed support of the pivot pin) and the member 50 to resiliently urge the member towards the head of the bolt 30 to resiliently confine the blades between the head of the bolt and the spring pressed member. Accordingly, it will be appreciated that as the blades move toward one another, and thus tend to separate at portions thereof rearwardly of the engaged points of the cutting edges, the spring 52 will yield to accommodate spreading of the blade members and yet will retain the cutting edges of the blades in operative association.

Heretofore, the art has suffered from a misconception of the amount of movement that need be accommodated and the amount of spring pressure that need be applied in main pivot means of the character referred to. Actually, the spring 52 need not be capable of exerting substantial force, a slight biasing pressure of sufficient magnitude to hold the blades together being all that is required. In addition, the movement that need be accommodated by the main pivot, or by the spring 52, is very slight. For example, with blades having approximately a five inch cutting edge, only 0.024 inch of relative movement at the pivot pin need be accommodated. As a margin of safety, and for manufacturing convenience, it is preferred that a clearance of approximately $\frac{1}{32}$ of an inch be provided in the specific example stated. However, it is important that the movement be readily accommodated and that the movement be not such as to exert a bending force on the pivot pin.

According to the present invention, the foregoing factors are taken care of by providing the spring pressed member 52 with an annular projection 54 engaging the top blade 36 to provide a support or fulcrum about which the blade may readily pivot to impart movement to the member 50 axially of the pin 30 whereby relative movement of the blades in a plane transverse of the plane of the blades is readily accommodated without application of bending forces to the pivot pin 30. The member 50 is received within and guided by the lower annular or cylindrical portion 24 of the housing 22. While the pin 30 freely passes through the central aperture provided in the member 50, the fit therebetween is preferably of a quite intimate nature so that the member 50 provides a second point of support for the pin 30, which second point of support is spaced a substantial distance from the first and relatively fixed support of the pin at the nut 32. Accordingly, the present invention provides for substantial support of the pivot pin. The member 50, like almost all of the component parts of the shears of the present invention, is preferably stamped from sheet metal. In formation, the member 50 is preferably provided in the original stamping with a slightly undersize central aperture and a slightly oversize outer diameter. The member is then stamped, in a coining operation, to form the annular projection 54, which, due to the coining, will comprise a smooth surfaced hemi-torus disposed coaxially of the aperture. Thereafter, the member is placed in a shaving die to properly size and provide finished surfaces for the central aperture and outer diameter thereof. Accordingly, the annular spring pressed member 50 may be closely guided by means of the cylindrical portion 24 of the housing member 22 to provide a firm secondary support for the pivot pin, which second support is spaced substantially from the first or main support of the pin, that is, the housing 22 and handle 10. As will be apparent from a consideration of Figure 3, coining of the hemi-torus projection 54 results in the formation of an annular indentation on the opposite side of the member 50, which indentation provides a seat for the spring 52.

Adjacent the free end of the rearwardly extending tab or lever portion 44 thereof, each blade is provided with an aperture adapted for the reception of a pivot pin, 56 and 58 respectively, by means of which a toggle link, 60 and 62 respectively, is pivotally secured thereto. The links 60 and 62 are pivotally connected at their inner ends by means of a pivot pin 64 comprising the actuating pivot of the toggle linkage. As will be appreciated, the lever portions 44 of the two blades are identical and have the same disposition with respect to the pivot pin 30. The toggle links 60 and 62 are also identical and accordingly the actuating pivot 64 of the toggle linkage will be disposed at the center of the linkage for movement along a straight line passing through the actuating pivot 64, the pivot pin 30 and the engaged portions or points of the cutting edges of the blades. As will be apparent, the engaged portions or points of the cutting edges of the blades will each lie equi-distant from the pivot pin 30 and will also each lie equi-distant from the actuating pivot 64 of the toggle linkage.

As originally formed, the actuating pivot 64 of the toggle linkage preferably comprises a generally cylindrical pin having an enlarged upper end portion. At the enlarged upper portion thereof, opposite edge portions of the pin are milled to provide a top portion 66 of the pin presenting a generally elliptical shape in cross section with two opposite walls thereof presenting flat surfaces. The pin is so milled as to provide an intermediate solid washer portion 68 adapted to engage one side of the central connection of the toggle links 60 and 62. After formation of the pin in the manner stated, the lower cylindrical portion of the pin is inserted through the apertures provided in the adjacent ends of the toggle links 60 and 62 and the depending lower portion of the pin is then preferably peened or riveted over, as at 70, to secure the pin 64 to the links 60 and 62 so as to provide a pivotal connection between the links. While the pin is preferably formed in the manner stated, it will be appreciated as the description proceeds that the actuating pivot 64 may be formed in any suitable manner, but that it is highly desirable that the same present oppositely disposed flat side wall surfaces adjacent the upper end thereof, as is provided by the top portion 66 of the actuating pivot described.

At the forward portion thereof, the lower handle member 12 is provided in the lower base wall thereof with a depending portion 72 provided with a central aperture to receive the top portion 66 of the actuating pivot 64. The depending portion 72 of the lower handle 12 comprises a driving portion by means of which the actuating pivot is engaged and moved upon actuation of the lower handle 12 with respect to the upper handle 10. The driving or depending portion 72 of the lower handle member 12 is provided therein with a pair of spaced parallel pins 74 which extend transversely of the handle 12 and are suitably secured to the opposite walls thereof. The pins 74 are spaced apart a distance very slightly in excess of the thickness of the top portion 66 of the actuating pivot 64 at the flatted sides thereof, so that the top portion 66 of the pivot is intimately received between the pins 74, with the pins 74 engaging the flatted sides thereof. As will be apparent from Figure 4, the top portion 66 of the pin is preferably confined between the side walls of the driving portion of the lower handle against transverse movement.

In use and operation of the shears as thus far described, the upper handle member 10, the component part or housing 22 and the pivot pin 30 are secured together and suitably comprise relatively stationary portions of the shears. The spring pressed member 50 is retained by the stationary portions of the shears and the remainder of the apparatus of the shears is suitably associated with the handle 12, which is the relatively movable handle, for actuation thereby. As the shears is used, the hand of the user primarily supports and guides the shears by means of the upper handle 10, which as is apparent comprises a frame or housing for the support and reception of the other components of the shears. Upon movement of the lower handle member 12 toward the upper handle member 10, the lower handle swings in an arc about its pivotal mounting 15, so as to move the depending, driving, or actuating portion 72 thereof rearwardly with respect to the handle 10. As the driving portion 72 of the handle 12 is moved rearwardly, the forward pin 74 thereof, engages the flatted surface 66 of the actuating pivot 64 to move the pivot rearwardly in a straight line.

As will be appreciated from a consideration of Figure 4, the toggle links 60 and 62 are in collapsed position when the handle member 12 is in its down position, at which time the blades and handles are opened. Accordingly, as the actuating pivot 64 is moved rearwardly, the toggle links 60 and 62 move toward their center of movement, thus spreading the lever portions 44 of the blades apart to move the cutting edge portions 40 of the blades toward one another. When the toggle links 60 and 62 reach their center of movement, as is shown in Figure 1, the blades are moved to their closed position, and are preferably moved to an overlapping postion as shown. In view of the foregoing, it will be appreciated that as the blades are closed and the cutting surface point therebeween moves outwardly along the length of the blades away from the main pivot 28, the force multiplication factor of the toggle linkage is increased to provide extreme ease of operation. During closing movement of the blades, the spring pressed follower member 50 maintains the blades in self-sharpening engagement and accommodates whatever movement is necessary between the blades due to the curvature thereof. The toggle linkage is readily adapted to accommodate the slight movement required between the blades during closing movement thereof.

When the blades are moved to their closed position, as is shown in Figure 1, it is merely necessary for the user to relax his grip on the handle 12, whereupon the spring 16 moves the handle 12 downwardly or away from the handle 10, thus causing the rearward pin 74 to engage the flat 66 of the actuating pivot 64 to move the toggle linkage to its collapsed position, wherein the blades are opened. As pointed out, the pins 74 closely confine the top portion 66 of the actuating pivot 64 therebetween to eliminate any lost motion between the actuating handle 12 and the blades 34 and 36, whereby the blades and handles are maintained in positive driving connection. Due to the fact that the portions of the actuating pivot engaged by the pins 74 are flat, the pins 74 always engage the actuating pivot along a line of contact, rather than a point of contact as has been common in the prior art, to reduce wear and provide an improved actuating means of long and efficient service.

As will be appreciated, grass shears of the general character referred to herein are utilized only during the growing season and are stored away during the winter or non-growing months of the year. After a prolonged period of storage, it is quite usual that the pivotal connection of the blades will require lubrication to insure efficient action of the shears with the ease of operation for which the shears are designed. Heretofore, lubricating the main pivot of shears has been a somewhat tedious and highly inefficient proposition. The main pivot provided by the present invention readily and conveniently lends itself to the provision of a highly efficient means and method of lubricating the pivotal connection between the blades. In fact, it is only necessary to provide a small oiling hole or aperture 75 in the exterior portion of the housing member 22 so that a lubricant may be introduced into the interior of the housing. As will be apparent, lubricant introduced into the interior of the housing 22 will readily flow over the pivot pin 30 and onto all surfaces of the blades 34 and 36 adjacent the pivot pin 30. Accordingly, lubrication of the shears may be readily attended to without any particular attention and in an extremely rapid and convenient manner.

In tools of the general character referred to herein, it is necessary that suitable means be provided to limit movement of the blades and handles in both directions, and it is also very desirable to provide means for locking the blades in their closed position to reduce danger in handling of the shears and to prevent dulling of the blades when the shears is stored away. Heretofore, motion limiting mean have customarily consisted for a first member, such as an elongate stud positioned between the handles and secured to one of the handles, to limit movement of the blades and handles toward one another and a second member, or set of members, such as projections on each blade adapted to engage one another, to limit opening movement of the blades and handles. The lock member, which conventionally is a third and separate member, has taken many forms, but usually comprises a strap or the like secured to one handle and adapted to be slipped over the other handle to hold the handles together in closed position.

It is an object and a definite advantage of the present invention to provide a convenient single assembly adapted to limit movement of the apparatus in both directions and to lock the shears in closed position. In particular, it is an object of the present invention to provide a single means for accomplishing all three functions. In its broader aspects, this feature of the present invention relates to the provision of a single means comprising a first abutment means adapted for cooperation with portions of the handles and/or blades for limiting movement of the handles and blades in both directions and second abutment means associated with the first abutment means and adapted for cooperation with portions of the handles and/or blades for locking the handles and blades in closed position. In the preferred embodiment of the invention, as is disclosed herein, both said abutment means are incorporated in a single unitary element adapted for cooperation with the handles to accomplish the three functions stated.

Referring now to the drawings, a preferred embodiment of the combined movement limiting and blade locking means of the present invention is shown as comprising a generally cylindrical limit and lock member or pin 76 having reduced outer end portions and a central enlargement, or enlarged central portion, 78. The limiting and locking member or pin 76 is extended through the interrelated portions of the handles 10 and 12. In particular, the limit and lock member 76 is extended through the parellel wall portions of the handles 10 and 12 adjacent the pivotal connection 15 thereof. It is preferred that the pin 76 be disposed at such a position that the included angle at the pin defined by lines connecting the pivot pin 15, the limiting and locking pin or member 76 and the actuating pivot 64, in both limits of movement of the actuating pivot 64, be large, that is, approaching 180 degrees. To accommodate the limiting and locking member or pin 76, the outer or upper handle member 10 is provided with apertures in the opposite walls thereof to receive the reduced end portions of the pin and the handle 12 is provided in the opposite walls thereof with slots, to be described in greater detail hereinafter, to accommodate passage of the pin. The apertures provided in the side walls of the handle 10 may be of substantially the same size as the reduced end portions of the pin 76. The pin 76 preferably comprises a cylindrical pin of uniform diameter and the enlargement 78 thereof preferably comprises a sleeve press-fitted on the pin. In assembly, the sleeve 78 is positioned between the walls of the lower handle and the pin 76 is passed through the apertures in the handle 10, the slots in the handle 12 and the sleeve 78 to complete the assembly as shown in the drawings. As will become apparent as the description proceeds, the handle 10 holds the pin 76 relatively stationary in the direction of the longitudinal axis of the handle 10, but accommodates lateral or transverse movement of the pin 76 with respect to the handles.

The slots provided in the opposite walls of the lower handle 12 each comprise a rearward slot portion 80 of a width accommodating the reduced ends of the pin 76 and a forward apertured or enlarged portion 82 of a size to accommodate the enlargement 78 of the pin. The slots in the handle 12 lie along an arc struck from the pivotal connection 15 of the handles so that pivotal movement of the lower handle 12 with respect to the upper handle 10 is readily accommodated by the pin 76. As will be apparent, the length of the slot will determine the travel of the blades 34 and 36 and of the handles 10 and 12. This movement is predetermined according to the structure and length of the handles, the blades, and the connection therebetween. Upon engagement of the rearward edge of the slot portion 80 with the reduced end portions of the pin 76, opening movement of the blades and handles will be limited or stopped, as is shown in Figures 3 and 4. Upon engagement of the front edge of the enlarged portion 82 of the slot with the pin 76, the closing movement of the handles and blades is limited. In other words, the reduced end portions of the pin 76 comprise an abutment means disposed at spaced points in the path of relative movement between the two handles to limit opening and closing movement of the handles and the blades and the length of the slots determines said limits.

To lock the blades and handles in closed position, it is merely necessary to move the lower handle 12 to the point at which the enlargements 82 in the slots are disposed in registry with the enlargement 78 of the pin 76, at which time the pin 76 may be moved laterally in either direction to move the enlargement 78 into one of the slot enlargements 82, whereupon the handles, and therefore the blades, will be locked against relative movement. Accordingly, it will be appreciated that the enlargement 78 comprises an abutment means movable into and out of the path of relative movement of the handles for locking the handles and blades. It is preferred that the enlarged portions 82 of the slots be very slightly larger than the enlargement 78 of the locking pin so that a firmly locked relationship will be maintained. To release the handles and blades, it is merely necessary to move the pin 76 laterally, and as the enlargement 78 clears the enlarged portion 82 of the slot in which the enlargement 78 was engaged, the spring 16 will immediately bias the handle members apart to move the handles and blades to their open positions. The pin 76 may be very small in diameter since the same need resist little force in excess of the pressure of the spring 16. To facilitate actuation of the pin 76, a push button 84 is preferably press fit to each end of the pin after assembly of the pin in the handles.

In use, opening and closing movement of the handles and blades is limited by engagement of the reduced end portions of the pin 76 with the opposite ends of the slots provided in the handle 12. At each end of the slot, or at each limit of movement of the handles and blades, the enlarged portion 78 of the pin cannot be moved to locked position since, when the blades are opened, the slot 80 is too small to accommodate the enlargement 78 and, when the blades are fully closed, the enlarged portions 82 of the slots are not registered with the enlargement 78 of the pin. To register the enlargements 78 and 82, it is necessary to open the handles slightly from their fully closed position. Therefore, in normal operation of the grass shears of the present invention, relative movement of the handles 10 and 12 at the point of registry of the enlargements 78 and 82 is very rapid and for this reason the enlargement 78 cannot accidentally fall into the enlarged portions of the slots. Therefore, the normal action of the blades and handles is positive and there is no danger of accidental lockup. However, to lock the blades and handles in closed position, it is merely necessary to move the blades and handles to their closed position, relax the grip on the handle slightly, exert a slight force on either of the push buttons 84 and, when registry is established, the enlargement 78 will be moved into the enlarged portion of one of the slots to lock the shears in closed position in an extremely simple and convenient manner.

As was briefly pointed out hereinbefore, substantially all of the component parts of the grass shears of the present invention may suitably comprise sheet metal stampings. In particular, all of the component parts are preferably formed of sheet metal in conventional drawing and stamping operation, with the exception of the pivot pin or pins 15, the bolt 30, the nut 32, the springs 16 and 52, the pin 74 and the limit and lock member or pin 76. Accordingly, it will be appreciated that the shears of the present invention is extremely economical in manufacture. As will be appreciated from the foregoing description, the assembly of the various component parts of the shears is readily and economically accomplished. In the end design, as will be readily appreciated from Figures 1 and 2, the shears presents an extremely neat and efficient appearance, which has heretofore been very difficult to attain due to the misconceptions and disadvantages of prior structures. Likewise, it will be appreciated that due to the particular construction and formation thereof, as described hereinbefore, the shears of the present invention is extremely sturdy and adapted for service over extended periods of time.

While I have described hereinbefore a particular embodiment of the improved apparatus provided by the present invention, it will be apparent to those skilled in the art that the preferred form shown and described is not the only form or embodiment suggested by the broad concepts involved. For example, modified forms of the main pivot and the limiting and locking means of the present invention have been utilized in the grass shears of my co-pending application, Serial No. 288,175, filed May 16, 1952.

Accordingly, it will be appreciated that various changes, rearrangements and modifications may be made in the preferred embodiment of my present invention without departing from the scope of the invention, as defined by the appended claims.

I claim:

1. A shears comprising a relatively fixed handle, a pivot pin fixedly supported in said handle, a pair of blades pivotally mounted on said pivot pin, a spring pressed member mounted on said pivot pin and resiliently retaining said blades in engagement, a second handle pivotally connected to said fixed handle for movement in a plane transversely of the plane of movement of said blades, a toggle linkage connecting said blades, said linkage being disposed to the handle side of said pivot pin, said linkage when extended closing said blades and when collapsed opening said blades, said second handle having a driving portion engaging the actuating pivot of said linkage for actuating said blades, said actuating pivot snugly fitting the driving portion of said second handle to insure straight line actuation, and a spring confined between said handles for normally collapsing said linkage.

2. A shears comprising a relatively fixed handle, a pivot pin fixedly supported in said handle, a pair of blades pivotally mounted on said pivot pin, a spring pressed member mounted on said pivot pin and resiliently retaining said blades in engagement, a second handle pivotally connected to said first handle for movement in a plane transversely of the plane of movement of said blades, a toggle linkage connecting said blades, said linkage being disposed to the handle side of said pivot pin, said linkage when extended closing said blades and when collapsed opening said blades, said second handle having a driving portion engaging the actuating pivot of said linkage for actuating said blades, a spring confined between said handles for normally collapsing said linkage, and means adapted for cooperation with said handles for limiting movement of said handles and said blades in both directions, said means including portions movable transversely of the plane of movement of said second handle for locking said handles and said blades in closed position.

3. A shears comprising a relatively fixed handle, a pivot pin supported by said handle, a pair of blades pivotally mounted on said pivot pin, a second handle pivotally connected to said fixed handle for movement in a plane transversely of the plane of movement of said blades, linkage means connecting said blades, said linkage means including a central pivot, said second handle having a driving portion adapted for cooperation with the central pivot of said linkage for actuating said blades, the driving portion of said second handle including a pair of spaced parallel pins, said central pivot of said linkage means having oppositely disposed flatted portions snugly fitting between said pins, said central pivot being confined within the driving portion of said second handle against transverse movement.

4. A shears comprising a pair of blades, means pivotally connecting said blades, and a pair of relatively movable handles, at least one of said handles being operatively associated with said blades whereby relative movement of said handles effects relative pivotal movement of said blades, said means comprising a pivot pin having a head, a housing providing a relatively fixed support for said pivot pin remotely of said head, a member mounted on said pin for movement axially thereof, said housing including a portion conformed to said member extending toward but spaced from said head, said member being conformably received within said portion of said housing, said blades being confined between said head and said member, and means biasing said member toward said head, said member providing a support for said pin at a point spaced from the relatively fixed support thereof.

5. A shears comprising a pair of blades, means pivotally connecting said blades, and a pair of relatively movable handles, at least one of said handles being operatively associated with said blades whereby relative movement of said handles effects relative pivotal movement of said blades, said means comprising a bolt having a head, a housing providing a relatively fixed support for said bolt remotely of said head to which said bolt is removably secured, a member mounted on said bolt for movement axially thereof, said housing including a portion conformed to said member extending toward but spaced from said head, said member being conformably received within said portion of said housing, said blades being pivotally mounted on said bolt and confined between said head and said member, said member to the blade side thereof presenting a projection of reduced area engaging one of said blades and providing a fulcrum about which said one blade may pivot in a plane transverse to the normal plane of movement thereof, and means biasing said member toward said head, said member providing a support for said bolt at a point spaced substantially from the relatively fixed support thereof.

6. A shears comprising a pair of blades, means pivotally connecting said blades, a pair of relatively movable handles, at least one of said handles being operatively associated with said blades whereby relative movement of said handles effects relative pivotal movement of said blades, said means comprising a bolt having a head, a housing providing a relatively fixed support for said bolt remotely of said head to which said bolt is removably secured, an annular member mounted on said bolt for movement axially thereof, said housing including a cylindrical portion within which said member is guided for axial movement along said bolt, said blades being pivotally mounted on said bolt and confined between said head and said member, said member to the blade side thereof presenting a projection in the nature of a hemi-torus engaging one of said blades and providing a fulcrum about which said one blade may pivot in a plane transverse to the normal plane of movement thereof, and a spring confined between said fixed support and said member for biasing said member toward said head, said member providing a support for said bolt at a point spaced substantially from the relatively fixed support thereof.

7. A shears comprising a pair of blades, means pivotally connecting said blades, a relatively fixed handle, a second handle pivotally supported by said fixed handle, said second handle being operatively associated with said blades for actuating the same, said means comprising a pivot pin having a head, said fixed handle providing a relatively fixed support for said pin remotely of said head, a member mounted on said pin for movement axially thereof, said blades being confined between said head and said member, and means biasing said member toward said head, said fixed handle providing means for guiding the movement of said member on said pin, said member providing a support for said pin spaced from the relatively fixed support thereof.

8. A shears comprising a pair of blades, means pivotally connecting said blades for movement toward and away from one another in a predetermined plane, a relatively fixed handle, a second handle pivotally supported by said fixed handle for movement in a plane transversely of said predetermined plane, and a toggle linkage pivotally connected to both of said blades to the handle side of said means, said second handle being operatively associated with said linkage for actuating said blades, said means comprising a bolt having a head, said fixed handle providing a relatively fixed support for said bolt remotely of said head to which said bolt is removably secured, a member mounted on said bolt for movement axially thereof, both of said blades being pivotally mounted on said bolt and confined between said head and said member, and a spring confined between said fixed support and said member for biasing said member toward said head, said member to the blade side thereof presenting a projection of reduced area engaging one of said blades and providing a fulcrum about which said one blade may pivot in a plane transverse to the normal plane of movement thereof, said fixed handle providing means for guiding the movement of said member on said bolt, said member providing a support for said bolt remotely of the said fixed support thereof.

9. A shears comprising a pair of pivotally connected blade members, a pair of relatively movable handle members at least one of which is operatively associated with said blade members for actuating the same, and means for limiting movement of said members in both directions and for locking said members together adjacent one limit of movement thereof, said means comprising first abutment means arranged to be engaged by both of the members of one of said pairs of members at spaced points in the path of relative movement of said members to define the limits of movement thereof, and second abutment means associated with said first abutment means, said second abutment means being movable with respect to said one pair of members and being movable to two positions, one outside the path of relative movement of said one pair of members and one in the path of relative movement of said one pair of members, said second abutment means being movable into the path of relative movement of said one pair of members when said one pair of members are moved to a position adjacent one limit of movement thereof to prevent movement of said one pair of members in said path.

10. A shears comprising a pair of pivotally connected blade members, a pair of relatively movable handle members at least one of which is operatively associated with said blade members for actuating the same, each pair of said members being adapted for opening and closing movement, and means for limiting movement of said members in both directions and for locking said members in their closed positions, said means comprising first abutment means arranged to be engaged by both of the members of one of said pairs of members at spaced points in the path of relative movement of said members to define the limits of movement thereof, and second abutment means associated with said first abutment means, said second abutment means being movable transversely of the plane of movement of said one pair of members into and out of the path of movement of said members, said second abutment means being movable into the path of relative movement of said one pair of members when said members are moved to a position adjacent their closed position to prevent opening movement of said members.

11. A shears comprising a pair of pivotally connected blades, a pair of relatively movable handles at least one of which is operatively associated with said blades for actuating the same, said handles having interrelated portions, and a pin disposed at the interrelated portions of said handles and mounted in one of said handles for movement transversely of the plane of movement of said handles, the other of said handles having a slot therein for the passage of said pin, said pin comprising abutment means between said handles whereby the limits of travel of said handles are determined by the length of said slot, said pin having an enlargement, said slot having an enlargement therein for the reception of said pin enlargement, said pin being movable when said enlargement is aligned to engage said pin with said other handle to lock said handles in a predetermined position.

12. A shears comprising a pair of blades, means pivotally connecting said blades, a relatively fixed handle, a second handle pivotally supported by said fixed handle, said handles being of channel cross section with at least portions of said second handle being received within said fixed handle, and a pin carried by said fixed handle, said pin extending transversely of said fixed handle at the portion thereof within which said second handle is received, said second handle at said portions thereof having slots in the opposite walls thereof for the reception of said pin, said slots constituting an arc struck from the pivotal connection of said handles, said pin comprising an abutment means between said handles whereby the limits of travel of said handles are determined by the length of said slots, said slots being enlarged at one end thereof, said pin having an enlarged central portion adapted for reception in the enlargement of either of said slots, said pin being mounted in said fixed handle for movement transversely of said handles whereby said handles may be locked together adjacent one limit of movement thereof.

13. A shears comprising: a pair of blade members; means pivotally connecting said blade members; a pair of relatively movable handle members at least one of which is operatively associated with said blade members for actuating the same; said means comprising a pivot pin having a head, a housing providing a relatively fixed support for said pin remotely of said head, a follower mounted on said pin for movement axially thereof, said blade members being confined between said head and said follower, and means biasing said follower toward said head, said follower providing a support for said pin remotely of the relatively fixed support thereof; and means for limiting movement of said members in both directions and for locking said members together adjacent one limit of movement thereof; said last-named means comprising first abutment means constructed and arranged to be engaged by both of the members of one of said pairs of members at spaced points in the path of relative movement of said members to define the limits of movement thereof, and a second abutment means associated with said first abutment means, said second abutment means being movable with respect to said one pair of members and being movable into and out of the path of relative movement of said one pair of members, said second abutment means being movable into the path of relative movement of said one pair of members when said one pair of members are moved to a position adjacent one limit of movement thereof to prevent movement of said one pair of members in said path.

14. A shears comprising: a pair of blade members; means pivotally connecting said blade members; a pair of relatively movable handle members at least one of which is operatively associated with said blade members for actuating the same; each pair of said members being adapted for opening and closing movement; said means comprising a bolt having a head, a housing providing a relatively fixed support for said bolt remotely of said head to which said bolt is removably secured, a follower mounted on said bolt for movement axially thereof, said blade members being pivotally mounted on said bolt and confined between said head and said follower, said follower to the blade side thereof presenting a projection of reduced area engaging one of said blade members and providing a support about which said one blade member may pivot in a plane transversely of the normal plane of movement thereof, and a spring confined between said fixed support and said follower for biasing said follower toward said head, said follower providing a support for said bolt remotely of the relatively fixed support thereof; and means for limiting movement of said members in both directions and for locking said members together in their closed positions; said last-named means comprising first abutment means constructed and arranged to be engaged by both of the members of one of said pairs of members at spaced points in the path of relative movement of said members to define the limits of movement thereof, and second abutment means associated with said first abutment means, said second abutment means being movable transversely of the plane of movement of said one pair of members into and out of the path of relative movement of said members, said second abutment means being movable into the path of relative movement of said one pair of members when said members are moved to a position adjacent their closed position.

15. A shears comprising: a pair of blades; means pivotally connecting said blades; a pair of relatively movable handles at least one of which is operatively associated with said blades for actuating the same; said means comprising a pivot pin having a head, one of said handles providing a relatively fixed support for said pin remotely of said head, a member mounted on said pin for movement axially thereof, said blades being confined between said head and said member, and means biasing said member toward said head, said one of said handles providing means for guiding the movement of said member on said pin, said member providing a support for said pin remotely of the relatively fixed support thereof; said handles having interrelated portions; and means for limiting movement of said blades and said handles and for locking said blades and said handles in a predetermined position; said means comprising a limit and lock member disposed at the interrelated portions of said handles and mounted in one of said handles for movement transversely of the plane of movement of said handles, the other of said handles having a slot therein for the passage of said limit and lock member, said limit and lock member comprising abutment means between said handles whereby the limits of travel of said handles are determined by the length of said slot, said limit and lock member having an enlargement and said slot having an enlargement therein for the reception of said limit and lock member enlargement, said limit and lock member being movable when said enlargements are aligned to engage said limit and lock member with said other handle to lock said handles in a predetermined position.

16. A shears comprising a relatively fixed handle, a bolt having a head, said handle providing a fixed support for said bolt remotely of said head, a pair of blades pivotally mounted on said bolt and supported by said head, a spring pressed member mounted on said bolt for movement axially thereof, said blades being resiliently confined between said head and said member, said handle providing a guide for said members, said member providing a support for said bolt remotely of the fixed support thereof, a second handle pivotally connected to said fixed handle for movement in a plane transversely of the plane of movement of said blades, a toggle linkage connecting said blades, said linkage being disposed to the handle side of said bolt, said linkage when extended closing the cutting portions of said blades and when collapsed opening the cutting portions of said blades, said linkage having a central actuating pivot, said second handle having a driving portion engaging the actuating pivot of said linkage for actuating said blades, a spring confined between said handles for normally collapsing said linkage, said handles being of channel cross section with at least portions of said second handle being received within said fixed handle, and a pin carried by said fixed handle, said pin extending transversely of said fixed handle at the portion thereof within which said second handle is received, said second handle at that portion thereof having slots in the opposite walls thereof for the reception of said pin, said pin comprising an abutment means between said handles whereby the limits of travel of said handles are determined by the length of said slots, said slots each being enlarged at the end thereof defining the limit of closing movement of said handles and said blades, said pin having an enlarged central portion adapted for reception in the enlargement of either of said slots, said pin being mounted in said fixed handle for movement transversely of said handles whereby said handles may be locked together in their closed position.

17. A shears comprising a relatively fixed handle, a pivot pin fixedly supported in said handle, a pair of blades pivotally mounted on said pivot pin, a spring pressed member mounted on said pivot pin and resiliently retaining said blades in engagement, a second handle pivotally connected to said fixed handle for movement in a plane transversely of the plane of movement of said blades, a toggle linkage connecting said blades, said linkage including a pair of links each pivotally connected to one of said blades to the handle side of said pivot pin, said links in the open position of said blades being disposed in angular relation and being movable toward straight line relation to close said blades, means connecting said links and said second handle to establish driving connection between said second handle and said blades, and a spring confined between said handles normally biasing said links to the said angular relation thereof.

LUCIEN I. YEOMANS.

References Cited in the file of this patent

UNITED STATES PATENTS

| Number | Name | Date |
|---|---|---|
| 1,891,694 | Svendsgaard | Dec. 20, 1932 |
| 2,306,506 | Simonsen et al. | Dec. 29, 1942 |